United States Patent Office 2,810,828
Patented Oct. 22, 1957

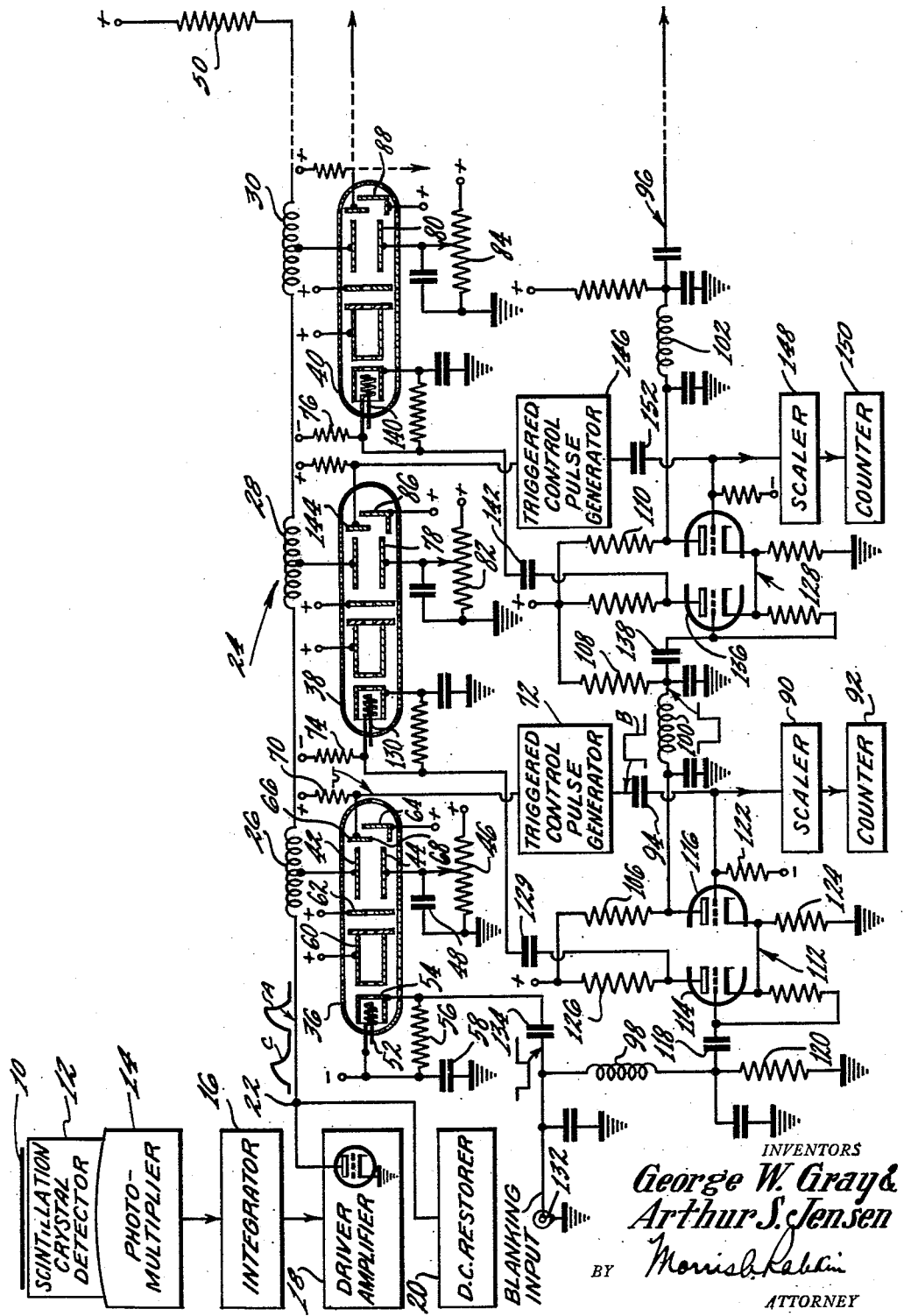

2,810,828

PULSE AMPLITUDE ANALYZER

George W. Gray, Lambertville, and Arthur S. Jensen, Princeton, N. J., assignors, by mesne assignments, to the United States of America as represented by the United States Atomic Energy Commission Application October 27, 1953, Serial No. 388,632

7 Claims. (Cl. 250—27)

This invention relates generally to pulse amplitude analyzers. More particularly, though not exclusively, this invention relates to apparatus for sorting and counting a series of pulses, such as provided by a scintillation detector when exposed to the products of nuclear disintegration, for the purpose of determining the distribution of these pulses in amplitude.

In several fields of investigation, particularly in that part of nuclear physics wherein beta ray and gamma ray spectra are of importance, it is necessary to analyze the amplitude distribution of a long series of pulses. In nuclear work, these pulses may be derived from the output of a photomultiplier as a result of scintillations caused by the energetic nuclear particles incident upon a fluorescent crystal, such as anthracene, sodium iodide, and the like. Each nuclear particle gives rise to a train of scintillations; each scintillation being a result of one atomic reorientation in the crystal. Since the nuclear scientist is interested in the energy of the nuclear particle, and since this energy is proportional to the number of such reorientations, the light energy caused by one incident particle must be integrated into a single voltage pulse. The pulse amplitude analyzer, in accordance with the present invention, receives only this single pulse per incident nuclear particle.

It has been proposed to build pulse amplitude analyzers of the type using a cathode ray tube having a plurality of targets. In this prior art apparatus, the pulse to be measured is applied to the deflection plates of the cathode ray tube in order to deflect the resultant electron beam an amount proportional to the amplitude of the pulse. The targets of the cathode ray tube are positioned in linear alignment with respect to each other along a line perpendicular to the electron beam. The particular target which receives the beam current is connected to recording means for indicating the amplitude of the pulse being measured. These prior art cathode ray tubes, and their associated circuits, present difficult problems in design and construction. The focussing and deflection sensitivity must be quite critical in order to avoid beam current striking more than one target for any one pulse being measured and to obtain reasonably accurate results.

There are also systems intended to reduce the bandwidth of television signals so that there may be used means of transmission, which are restricted in their frequency response, without loss of detail in the picture. Some of these systems require that the original television signal be sampled at certain instants of time and that the thus sampled signal be modified in accordance with its amplitude. A pulse amplitude analyzer is required to measure and channelize such sampled signals for modification. Such a pulse amplitude analyzer must be capable of measuring these signals, with reasonable accuracy, when their repetition rate may exceed 5 million pulses per second.

One of the major problems in the design of a pulse amplitude analyzer is the determination of the interval of time during which the pulse is near its peak value. In most of the prior art analyzers, these intervals of time are precalculated from the time constant of an integration circuit, and the analyzer is rendered operative during these preset time intervals. The pulse amplitude, however, is not constant but, in fact, does change during that interval of time with the result that often one pulse activates two of the analyzer's amplitude channels simultaneously, and causes an error in sorting and counting.

It is, therefore, a principal object of the present invention to provide an improved pulse amplitude analyzer having features which will overcome the above-mentioned difficulties and disadvantages.

It is another object of the present invention to provide an improved pulse amplitude analyzer which will analyze a series of pulses and provide a measure of their distribution in amplitude.

Still another object of the present invention is to provide an improved pulse amplitude analyzer using cathode ray tubes of relatively simple design and construction, and employing associated circuitry permitting the deflection sensitivity of the cathode ray tube to be much greater than in prior art analyzer systems.

A further object of the present invention is to provide an improved pulse amplitude analyzer wherein non-linearities in the input circuits can be compensated, wherein the defocussing and rate of change of the deflection sensitivity with deflection of the beams of the cathode ray tubes do not affect the operation of the system, and wherein the cathode ray tube beam currents need not be precisely constant.

Still a further object of the present invention is to provide an improved pulse amplitude analyzer wherein no part of the circuitry need be of any wider bandwidth than that required to pass the unknown pulses accurately, thereby resulting in a system which can be extended to relatively high pulse repetition rates.

According to the invention, these and other objects and advantages are attained in an improved apparatus for sorting pulses of voltage of different amplitudes into separate channels, whereby each channel will receive pulses of substantially the same amplitude, and for counting the pulses in each of the channels. A pulse of unknown amplitude, which is to be sorted and counted is fed from an integrating circuit into a driver amplifier, the last stage of which is carefully D. C. restored. The output of the driver amplifier inserts the pulse into a main, multi-section transmission line whose shunt capacitors may be the deflection plates of cathode ray beam deflection tubes. Each section of the main transmission line comprises a cathode ray tube having an electron gun, a pair of electrostatic deflection plates, and a collecting target whose lower edge is the mean position of the electron beam when the difference in potential between the deflection plates is zero. One of the deflection plates of each cathode ray tube in each section in the main transmission line is biased progressively less positively in such a manner that a pulse travelling down the main transmission line will deflect upon their respective targets the beams of all of the tubes for which the amplitude of the pulse exceeds the bias. The order number of the first cathode ray tube whose beam is so deflected is proportional to the difference between the pulse amplitude being measured and the maximum amplitude acceptable by the apparatus, due allowance being made for attenuation of the pulse by the main transmission line. An output signal derived from the first cathode ray tube, in one of the sections of the main transmission line, that becomes conductive is applied to a triggered control pulse generator. The shunt capacitances in the main transmission line may be the input capacitances of any well known threshold circuits, for example, monostable multivibrators, whose thresholds are set by appropriate biasing method progressively closed to the D. C. restored reference level.

Each of these threshold circuits in its turn will activate its associated triggered control pulse generator or the output of the threshold circuit itself may be the triggered control pulse. The resultant controlled pulse is inserted into a control transmission line running parallel to the main transmission line. The control transmission line comprises a series of sections, each having a cathode coupled amplifier, or other unidirectional device, and a section of delay line combined to form a transmission line with very little, if any, attenuation for signals travelling in one direction, but with very great attenuation for signals travelling in the opposite direction. The constants of the circuits are chosen so that the delay time per section is the same in both the main transmission line and the control transmission line. The main transmission line and the control transmission line are interconnected by circuit means by means of which the beams in the cathode ray tubes subsequent to the cathode ray tube rendered conductive by the unknown pulse are cut off. Therefore, for each unknown pulse inserted into the main transmission line by the driver amplifier, one and only one, cathode ray tube is rendered conductive. The output of the conducting cathode ray tube forms a control pulse in the control transmission line to prevent the unknown pulse, as it continues down the main transmission, from rendering any other cathode ray tube conductive. The output from the triggered control pulse generator also actuates a respective scaler and counter circuit associated with each section of the main transmission line.

The novel features of the invention, as well as the invention itself, both as to its organization and method of operation will be understood in detail from the following description when considered in connection with the accompanying drawing which is a schematic diagram of a pulse amplitude analyzer in accordance with the present invention.

Referring now to the drawing, there is shown a pulse amplitude analyzer, in accordance with the present invention, wherein the pulses derived from a nuclear particle source 10 are to be analyzed. The circuits shown in block diagram form are of conventional type, well known in the art, and, therefore, their details of construction and operation are omitted for the sake of simplicity. Energy resulting from the nuclear disintegration of a nuclear particle from the source 10 is detected by a scintillation crystal detector 12, wherein a crystal of anthracene, sodium iodide, or the like, is caused to scintillate, in a manner well known in the art. These scintillations are directed to a photomultiplier 14, and the current therefrom is applied to an integrator circuit 16 to form a voltage pulse. In this manner, the energy of a single nuclear particle, as for example, a beta particle is detected and integrated into a single pulse. The pulse amplitude analyzer, in accordance with the present invention, receives only one pulse per incident nuclear particle. The shape of this pulse is determined largely by the constants of the integrating circuit 16.

The output pulse from the integrating circuit 16 is fed to a driver amplifier 18 where it is amplified. The last stage of the driver amplifier 18 is carefully D. C. restored to a reference potential by a D. C. restorer 20, of conventional design, so that all pulses will have their amplitudes measured from this reference potential. The D. C. restored output pulse, whose amplitude is to be measured, is applied to the input terminal 22 of a main transmission line 24, of low loss, and good frequency and phase characteristics.

The main transmission line 24 comprises a plurality of sections each of which has an inductance 26, 28, 30, etc., respectively, and a cathode ray tube 36, 38, 40, etc., respectively. While only three sections of the main transmission line 24 are illustrated, for the sake of simplicity, it is understood that there will be as many sections in the transmission line as the number of channels into which the train of pulses of unknown amplitude are to be sorted and counted. The shunt capacitor for the first section of the transmission line 24 is formed by the deflection plate 42 of the cathode ray tube 36. The upper plate 42 is connected to a point intermediate the ends of the inductance 26, and the lower plate 44 of the tube 36 is connected to ground through the movable tap on a potentiometer 46. A source of voltage (not shown) is connected across the potentiometer 46 in order to bias the deflection plate 44 positively with respect to ground, for the purpose hereinafter appearing. The plate 44 is also bypassed to ground by a bypass capacitor 48.

The sections of the transmission line 24 are connected to each other by connecting the inductances 26, 28, 30, etc. in series. The transmission line 24 is terminated by connecting it to a source of unidirectional potential (not shown) through an appropriate terminating impedance 50. The transmission line 24 is appropriately terminated in order to prevent unwanted reflections, in a manner well known in the art. The cathode ray tube 36 comprises the usual electron gun having a cathode 52 and a control grid 54. The cathode 52 is connected to a source of filament voltage (not shown) and to the negative terminal of a source of voltage (not shown). The cathode 52 is connected through a resistor 56 to the grid 54, and is bypassed to ground by capacitor 58. A first anode 60, a second anode 62, and an accelerating anode 64 of the cathode ray tube 36 are each connected to sources of operating potential (not shown), in a manner well known in the art. A target 66 is positioned within the evacuated envelope of the cathode ray tube 36 so that its lower edge 68 will just intercept the electron beam of the tube 36 when the difference in potential between the deflection plates 42 and 44 is a predetermined value, say zero. The target 66 is connected to a source of positive potential through a load resistor 70, and to a triggered control pulse generator 72, for the purpose hereinafter appearing.

The cathode ray tubes 38 and 40 are substantially similar to the cathode ray tube 36, and are connected in the second and third sections, respectively, of the transmission line 24 in substantially the same manner as the tube 36, except that their grids are bypassed to ground and the control signals are applied to their cathodes. The cathodes of tubes 38 and 40 are connected to sources of negative potential (not shown) through resistors 74 and 76, respectively.

The lower deflection plates 44, 78, 80, etc., of the tubes 36, 38, 40, etc., are biased progressively less positively by adjusting the variable tap on the potentiometers 46, 82, 84, etc., respectively. Thus, it will be understood that when no pulse is travelling down the main transmission line 24 the electron beams in all of the cathode ray tubes will be deflected downwardly so that they will impinge upon the electrodes 64, 86, 88, etc. of the tubes 36, 38, 40 etc., respectively. Also, it will be understood that a positive pulse travelling down the transmission line 24 will deflect upon their respective targets the electron beams of all the tubes for which the amplitude of the pulse exceeds the bias between the deflection plates of the tubes. The order number of the first cathode ray tube whose beam is so deflected is proportional to the difference between the pulse amplitude being measured and the maximum amplitude pulse acceptable by the pulse amplitude analyzer apparatus. For example, if a pulse A travelling down the transmission line 24 is of sufficient amplitude to overcome the positive bias on the plate 44 of the tube 36, that is, the potential difference between the plates 42 and 44 is zero, the electron beam of the tube 36 will just impinge upon the lower edge 68 of the target 66 and cause conduction through the tube 36. As a consequence of the load resistor 70, a signal is applied to the triggered control pulse generator 72. The generator 72 may be of any suitable type, such as a monostable multivibrator of conventional design. The output of the generator 72, which may be in the form of the square pulse B, is applied to a scaler 90, through a capacitor 94, and thence to a counter 92, of conventional design, whereby the fact that the pulse A caused conduction first in the cathode ray tube 36 is tallied.

It is obvious, with the circuitry and biasing thereof thus far described, that a pulse which is sufficient to cause conduction in one of the cathode ray tubes will cause conduction in every subsequent cathode ray tube along the transmission line 24. Thus, since the plates 78 and 80 of the tubes 38 and 40 are biased progressively less positively than the plate 44 of the tube 36, the tubes 38 and 40 will be rendered conductive. Also, since there is a triggered control pulse generator, scaler, and counter connected to each of the sections of the transmission line 24, in a manner similar to the generator 72, scaler 90, and counter 92 in the first section of the transmission line, all of the subsequent counters will tally. In order to sort pulses, however, it is necessary to tally only once the counter associated with the cathode ray tube which has been rendered conductive first. All of the subsequent cathode ray tubes must have their beams cut off or rendered non-conductive. To this end, there is provided a second or control transmission line 96 and means connecting it to the main transmission line 24.

The control transmission line 96 runs parallel to the main transmission line 24 and comprises a plurality of sections each of which causes the same time delay as a corresponding section of the main transmission line 24. The control transmission line 96 comprises sections of delay lines 98, 100, 102, etc., either of the lumped or distributed constants type depending upon the bandwidth desired and chosen in the manner well known to the art.

This series of delay lines is connected to each other through cathode coupled amplifiers, one between each pair of adjacent delay line sections. To this end, for example, a cathode coupled amplifier 112, comprising a first triode 114 and a second triode 116 has the grid of the triode 114 coupled to one end of the delay line 98 through a capacitor 118, and to ground through a terminating resistor 120. The anode of the triode 116 is connected to an end of the delay line 100. The grid of the triode 116 is connected to a source of negative potential (not shown) through a resistor 122. The cathodes of the triodes 114 and 116 are coupled by sharing a common cathode resistor 124. The anode of the triode 114 is connected to a source of positive potential (not shown) through a load resistor 106. Resistors 120 and 108 are carefully chosen to be the characteristic impedance of the delay lines with which they are associated so that signals travelling along the control transmission line 96 will not be reflected at a cathode coupled amplifier. The delay line 98 and the cathode coupled amplifier 112, and their associated circuitry, comprise one section of the multi-section control transmission line 96. The second section of the control transmission line 96 comprises the delay line 100 and a cathode coupled amplifier 128, having substantially the same circuitry as described for the first section of the control transmission line 96 comprising the delay line 98 and the cathode coupled amplifier 112.

Interconnecting means are provided between the main transmission line 24 an the control transmission line 96 to cut off conduction in all of the cathode ray tubes subsequent to the first one that exhibits conduction as a result of a voltage pulse travelling down the main transmission line 24. To this end the target of the cathode ray tube in each section of the transmission line 24 is coupled to the grid of the second triode in a corresponding section of the control transmission line 96. For example, the target 66 of the cathode ray tube 36 is connected to the grid of the triode 116, through the generator 72, and the capacitor 94. Also, the anode of the first triode of the cathode coupled amplifier in each section of the control transmission line 96 is coupled to the cathode of the cathode ray tube in the section of the main transmission line 24 subsequent to the corresponding section of the control transmission line 96. For example, the anode of the triode 114, in the first section of the control transmission line 96, is connected to the cathode 130 of the cathode ray tube 38, in the second section of the main transmission line 24, through a capacitor 129.

The grid of the first triode 114, of the cathode coupled amplifier 112, in the first section of the control transmission line 96, may be used as an input for negative pulses which render the pulse amplitude analyzer insensitive at desired times. This blanking feature may be useful for coincidence or anti-coincidence counting. To this end, a blanking input terminal 132 is connected to the grid of the triode 114, through the delay line 98 and the capacitor 118. The blanking input terminal 132 is also connected to the control grid 54 of the cathode ray tube 36, through a capacitor 134.

The operation of the pulse amplitude analyzer, in accordance with the present invention, will now be described. Let it be assumed that the pulse A is a pulse of the largest amplitude that is to be measured. The positive bias on the deflection plate 44 of the cathode ray tube 36 is then adjusted so that it will have a voltage substantially equal to the amplitude of the pulse A. The corresponding deflection plates of the subsequent cathode ray tubes are biased progressively less positive. It will be understood that the cathode ray tube 36 will produce an electron beam which will just impinge upon the lower edge 68 of the target 66 when the difference in potential between the plates 42 and 44 is zero. Therefore, as the pulse A travels down the main transmission line 24, the cathode ray tube 36 will be rendered conductive when its electron beam strikes the lower edge 68 of the target 66. As a result of conduction through the tube 36, a signal at the target 66 is fed to the triggered control pulse generator 72, and thence to the scaler 90 and counter 92, through the capacitor 94. The counter 92 will tally once the fact that the cathode ray tube 36 has been rendered conductive, thereby sorting and counting the voltage pulse A.

The signal from the target 66 is also fed to the grid of the second triode 116 of the cathode coupled amplifier 112, through the capacitor 94. Since this signal emerges from the generator 72 as a positive-going square pulse B, the signal derived at the anode of the first triode 114 of the cathode coupled amplifier 112 will also be positive. This latter positive-going voltage is coupled to the cathode 130 of the cathode ray tube 38 in the second section of the main transmission line 24 through the capacitor 129. The result of the positive-going voltage on the cathode 130 of the tube 38 will cut off conduction in the tube 38, that is, its electron beam will not hit its target 144. Thus as the pulse A travels down the transmission line 24, conduction will not be rendered in the cathode ray tube 38, provided only that the time required for the operation of the triggered control pulse generator 72 and its resultant action on the cathode ray tube 38 is just equal to the time of transmission of the pulse A from the cathode ray tube 36 to cathode ray tube 38.

A negative-going pulse at the anode of the second triode 116 of the cathode coupled amplifier 112 is also applied to the grid of the first triode 136 of the cathode coupled amplifier 128, in the second section of the control transmission line 96, through the delay line 100 and a capacitor 138. Consequently, a positive-going voltage will be applied to the cathode 140 of the cathode ray tube 40, through a capacitor 142. The effect of this latter positive-going voltage on the cathode 140 of the cathode ray tube 40 is to cut off conduction in the cathode ray tube 40, provided, again, that the delay line 100 has delayed the control pulse for a time equal to the time of transmission of the pulse A from the tube 38 to the tube 40. Thus it is seen that as the pulse A travels down the main transmission line 24, it will not render the cathode ray tube 40 conductive. Since the main transmission line 24 and the control transmission line 96 comprise a series of substantially similar multi-sections, respectively, it is now obvious that all cathode ray tubes subsequent to the one that has been rendered conductive will be rendered non-conductive in the manner explained when the constants of the delay line sections have been chosen such that the time of transmission of a control pulse for one section along the control transmission line 96 is exactly equal to the time of transmission of the pulse A for one section along the main transmission line 24. Pulse A on the main transmission line 24 and its associated control pulse in the control transmission line 96 travel along their respective transmission lines side by side each reaching any one cathode ray tube at exactly the same time. Thus, it is seen that as the voltage pulse A, of maximum amplitude, travels down the transmission line 24 it is counted at the first section only of the main transmission line 24, and tallied on the counter 92.

Let it now be assumed that a second pulse C, of slightly less amplitude than the pulse A, follows the pulse A. The pulse C will not apply a sufficiently positive charge on the plate 42 of the cathode ray tube 36 in order to render it conductive. If the pulse C is of an amplitude equal to or greater than the positive bias applied to the deflection plate 78 of the cathode ray tube 38, it will render the cathode ray tube 38, in the second section of the transmission line 24, conductive; that is, the electron beam of the cathode ray tube 38 will impinge upon its target 144. As a result, a signal voltage at the target 144 will be applied to the triggered control pulse generator 146, and thence to a scaler 148 and counter 150, through a capacitor 152. Thus, it is seen that the voltage pulse C is channelled through the second section of the transmission line 24, and tallied. The cathode ray tube 40 in the section of the transmission line 24 subsequent to the section comprising the cathode ray tube 38, which was just rendered conductive, is rendered nonconductive as a result of the positive-going voltage from the generator 146 passing through the cathode coupled amplifier 128, and applied to the cathode 140 from the anode of the first triode 136, through the capacitor 142. In a similar manner, conduction in all subsequent cathode ray tubes (not shown) in the transmission line 24 is cut off.

Since the cathode coupled amplifiers 112, 128, etc. can have a gain greater than unity, there can be negative attenuation or gain in the forward direction. The control transmission line 96 is so designed that its delay per section is exactly the same as the delay per section of the main transmission line 24. In other words, the delay of these circuits is adjusted so that the delay between the output of one cathode ray tube to the cathode of the next cathode ray tube is just equal to the delay per section of either transmission line. As explained, the gain of each cathode coupled amplifier may be greater than the unity so that in each section the second triode of the cathode coupled amplifier may be driven from cut off to saturation, and the signal therefore, may be of the same amplitude in each section, there being no attenuation as it travels down the control transmission line 96.

Thus, there has been shown and described a pulse amplitude analyzer, in accordance with the objects of the present invention, wherein the pulses of different amplitude are sorted into separate channels, and each channel counts pulses of substantially the same amplitude. The pulse amplitude analyzer utilizes cathode ray tubes of relatively simple design wherein the deflection sensitivity can be made much greater than in other analyzer systems because only one edge of a single target is to be considered in setting the bias for the cathode ray tube. It is also obvious that the apparatus of the present invention does not utilize any circuitry of a bandwidth wider than that required to pass the unknown pulses accurately, thereby providing apparatus for use in sorting and counting pulses of high repetition rate.

We claim:

1. In a pulse analyzer for sorting pulses of voltage, a main transmission line comprising a first series of connected sections, a control transmission line comprising a second series of connected sections, means to apply said pulses to said main transmission line only whereby said pulses are conducted therealong from section to section, a separate indicating means connected to each of said sections in said first series and responsive to pulses of a predetermined size, said indicating means in each succeeding section being responsive to pulses of progressively smaller amplitude, means cooperatively associated with each of said sections in said first series to render one of said indicating means operative first in response to a pulse of predetermined amplitude, and means connected between said main and said control transmission lines to render inoperative said indicating means in sections subsequent to the section associated with said one of said indicating means.

2. In a pulse analyzer for sorting and counting pulses of voltage, a main transmission line comprising a first series of connected sections, a control transmission line comprising a second series of connected sections, means to apply said pulses to said main transmission line only whereby said pulses are conducted therealong from section to section, a separate counting means connected to each of said sections in said first series and responsive to pulses of a predetermined size, said counting means in each succeeding section being responsive to pulses of progressively smaller amplitude, means cooperatively associated with each of said sections in said first series to render one of said counting means operative first in response to a pulse of predetermined implitude, and means connected between said main and said control transmission lines to render inoperative said counting means in sections subsequent to the section associated with said one of said counting means, each of said sections in said second series comprising unidirectional delay means.

3. In a pulse analyzer for sorting and counting pulses of voltage, a main transmission line comprising a first series of connected sections, a control transmission line comprising a second series of connected sections, means to apply said pulses to said main transmission line only whereby said pulses are conducted therealong from section to section, a separate counting means connected to each of said sections in said first series and responsive to pulses of a predetermined size, said counting means in each succeeding section being responsive to pulses of progressively smaller amplitude, means cooperatively associated with each of said sections in said first series to render one of said counting means operative first in response to a pulse of predetermined amplitude, and means connected between said main and said control transmission lines to render inoperative said counting means in sections subsequent to the section associated with said one of said counting means, each of said sections in said first series comprising an inductance and a threshold circuit having capacitance input means, said means cooperatively associated with each section to render one of said counting means operative comprising voltage bias means, and said capacitance input means being connected between a point on said inductance and said voltage bias means.

4. In a pulse analyzer for sorting and counting pulses of voltage, a main transmission line comprising a first series of connected sections, a control transmission line comprising a second series of connected sections, means to apply said pulses to said main transmission line whereby said pulses are conducted therealong from section to section, a separate counting means connected to each of said sections in said first series and responsive to pulses of a predetermined size, said counting means in each succeeding section being responsive to pulses of progressively smaller amplitude, means cooperatively associated with each of said sections in said first series to render one of said counting means operative first in response to a pulse of predetermined amplitude, and means connected between said mian and said control transmission lines to render inoperative said counting means in sections subsequent to the section associated with said one of said counting means, each of said sections in said first series comprising an inductance, a cathode ray tube having an electron gun, a target, a pair of deflection plates, and means to apply operating potentials to said cathode ray tube for rendering said gun operative to project an electron beam therefrom, one of said pair of plates being connected to a point intermediate the ends of said inductance, said means cooperatively associated with each section to render one of said counting means operative comprising voltage bias means connected to the other of said pair of plates, and each of said sections in said second series comprising a delay line and a cathode coupled amplifier coupled thereto.

5. A pulse analyzer for sorting and counting pulses of voltage comprising a main transmission line having a plurality of sections, each of said sections comprising an inductance, a cathode ray tube comprising an electron gun, a target, means supplying operating voltages to said cathode ray tube for rendering said gun operative to project an electron beam therefrom, and a pair of beam deflection plates positioned between said gun and said target, one of said plates being connected to a point intermediate the ends of said inductance, voltage bias means connected to the other of said plates, said target having an edge positioned to intercept said beam only when the voltage between said plates is a predetermined value, said other of said plates in the cathode ray tube in each of said sections of said transmission line being biased progressively less positively, a control transmission line having a plurality of sections, each of said last-mentioned sections comprising a delay line and a cathode coupled amplifier coupled thereto, means to apply each of said pulses to the input of said main transmission line whereby to cause the electron beam in one of said cathode ray tubes to strike its target first and thereby cause it to conduct, means connected between said main and said control transmission lines and responsive to said conducting cathode ray tube to cut off the electron beams in the cathode ray tubes in the sections subsequent thereto, and means for indicating the particular target which intercepts its beam first.

6. A pulse analyzer for sorting and counting pulses of voltage comprising a main transmission line having a plurality of sections, each of said sections comprising an inductance, a cathode ray tube comprising an electron gun, a target, means supplying operating voltages to said cathode ray tube for rendering said gun operative to project an electron beam therefrom, and a pair of beam deflection plates positioned between said gun and said target, one of said plates being connected to a point intermediate the ends of said inductance, voltage bias means connected to the other of said plates, said target having an edge positioned to intercept said beam only when the voltage between said plates is a predetermined value, said other of said plates in the cathode ray tubes in each of said sections of said transmission line being biased progressively less positively, a control transmission line having a plurality of sections, each of said last-mentioned sections comprising a delay line and a cathode coupled amplifier coupled thereto, means to apply each of said pulses to the input of said main transmission line whereby to cause the electron beam in one of said cathode ray tubes to strike its target first and thereby cause it to conduct, means connected between said main and said control transmission lines and responsive to said conducting cathode ray tube to cut off the electron beams in the cathode ray tubes in the sections subsequent thereto, and means for indicating the particular target which intercepts its beam first, each of said cathode coupled amplifiers comprising a first and a second tube each having a cathode, a grid, and an anode, each of said delay lines in each of the sections of said control transmission line being coupled to the grid of said first tube in said amplifier in its respective section, and means connecting the anode of said second tube of said amplifier in each section to the delay line in the next succeeding section of said control transmission line.

7. A pulse analyzer for sorting and counting pulses of voltage comprising a main transmission line having a plurality of sections, each of said sections comprising an inductance, a cathode ray tube comprising an electron gun, a target, means supplying operating voltages to said cathode ray tube for rendering said gun operative to project an electron beam therefrom, and a pair of beam deflection plates positioned between said gun and said target, one of said plates being connected to a point intermediate the ends of said inductance, voltage bias means connected to the other of said plates, said target having an edge positioned to intercept said beam only when the voltage between said plates is a predetermined value, said other of said plates in the cathode ray tubes in each of said sections of said transmission line being biased progressively less positively, a control transmission line having a plurality of sections connected to each other, each of said last-mentioned sections comprising a delay line and a cathode coupled amplifier coupled thereto, means to apply each of said pulses to the input of said main transmission line whereby to cause the electron beam in one of said cathode ray tubes to strike its target first and thereby cause it to conduct, means connected between said main and said control transmission lines and responsive to said conducting cathode ray tube to cut off the electron beams in the cathode ray tubes in the sections subsequent thereto, and means for indicating the particular target which intercepts its beam first, each of said cathode coupled amplifiers comprising a first and a second tube each having a cathode, a grid, and an anode, each of said delay lines in each of the sections of said control transmission line being coupled to the grid of said first tube in said amplifier in its respective section, means connecting the anode of said second tube in said amplifier in each section to the delay line in the next succeeding section of said control transmission line, and said means connected between said main and control transmission lines comprising a separate triggered control pulse generator connected in circuit between the target of the cathode ray tube in each section of the main transmission line and the grid of said second tube in a corresponding section of said control transmission line, and the anode of said first tube of said amplifier in each section of said control transmission line being coupled to the gun of the cathode ray tube in a succeeding section of said main transmission line.

References Cited in the file of this patent

UNITED STATES PATENTS

| 2,412,467 | Morton | Dec. 10, 1946 |
| 2,449,819 | Purington | Sept. 21, 1948 |
| 2,529,666 | Sands | Nov. 14, 1950 |
| 2,589,130 | Potter | Mar. 11, 1952 |
| 2,593,948 | Wiegand | Apr. 22, 1952 |